(12) United States Patent
Chen et al.

(10) Patent No.: US 10,459,084 B2
(45) Date of Patent: Oct. 29, 2019

(54) RANGE SENSING USING A HYBRID RANGE SENSING DEVICE

(71) Applicant: Nokia Technologies Oy, Espoo (FI)

(72) Inventors: Xin Chen, Evanston, IL (US); Ruigang Yang, Lexington, KY (US)

(73) Assignee: Nokia Technologies Oy, Espoo (FI)

( * ) Notice: Subject to any disclaimer, the term of this patent is extended or adjusted under 35 U.S.C. 154(b) by 783 days.

(21) Appl. No.: 14/586,630

(22) Filed: Dec. 30, 2014

(65) Prior Publication Data

US 2016/0187486 A1 Jun. 30, 2016

(51) Int. Cl.
| | |
|---|---|
| G01S 17/88 | (2006.01) |
| G01S 15/08 | (2006.01) |
| G01S 17/02 | (2006.01) |
| G01S 17/89 | (2006.01) |
| G01S 15/89 | (2006.01) |

(52) U.S. Cl.
CPC ............. *G01S 17/88* (2013.01); *G01S 15/08* (2013.01); *G01S 15/89* (2013.01); *G01S 17/023* (2013.01); *G01S 17/89* (2013.01)

(58) Field of Classification Search
CPC ........ G01S 17/88; G01S 17/023; G01S 17/89; G01S 15/08; G01S 15/89
See application file for complete search history.

(56) References Cited

U.S. PATENT DOCUMENTS

| | | |
|---|---|---|
| 2012/0253582 A1 | 10/2012 | Chrysanthakopoulos et al. |
| 2014/0002444 A1 | 1/2014 | Bennett et al. |
| 2014/0005886 A1 | 1/2014 | Morris et al. |
| 2014/0300597 A1 | 10/2014 | Holcomb |
| 2015/0085935 A1* | 3/2015 | Chen .................... H04N 19/597 375/240.16 |

FOREIGN PATENT DOCUMENTS

WO WO2012155104 11/2012

OTHER PUBLICATIONS

Kleeman, "On-the-fly Classifying Sonar with Accurate Range and Bearing Estimation", IEEE/RSJ Int. Conf. on Intelligent Robots & Systems, p. 178-183, 2002.*

(Continued)

*Primary Examiner* — Mohamed Charioui
*Assistant Examiner* — Catherine T. Rastovski
(74) *Attorney, Agent, or Firm* — Lempia Summerfield Katz LLC (57) ABSTRACT

A method includes identifying, by a processor, a first range data set. The first range data set is generated by a first device and includes first range data points. The processor identifies a second range data set. The second range data set is generated by a second device and includes second range data points. The processor compares the second range data points to the first range data points. The processor identifies a third range data set based on the comparison. The third range data set includes a subset of the second range data points. The processor adjusts distance values for first range data points of the first range data set corresponding to a portion of the surface of interest based on the third range data set.

15 Claims, 5 Drawing Sheets

(56) References Cited

OTHER PUBLICATIONS

Weng et al., "A Segmentation and Data Association Annotation System for Laser-based Multi-Target Tracking Evaluation", The 2012 IEEE/ASME International Conference on Advanced Intelligent Mechatronics, Jul. 11-14, 2012, Kaohsiung, Taiwan.*

Shao-Wen Yang et al., "Dealing with Laser Scanner Failure: Mirrors and Windows", 2008 IEEE Intl. Conf. Robotics and automation, Pasadena, CA, USA, May 19-23, pp. 3009-3015, (2008).*

Diosi et al. "Advanced Sonar and Laser Range Finder Fusion for Simultaneous Localization and Mapping", Proceedings of 2004 IEEE/RSJ Intl Conf on Intelligent Robots and Systems, pp. 1854-1859 (2004).*

Sensors and Range Measurement, Power Point presentation, 2012.

* cited by examiner

RANGE SENSING USING A HYBRID RANGE SENSING DEVICE

FIELD

The following disclosure relates to range sensing. In particular, the following disclosure relates to systems, apparatuses, and methods for range sensing structures at least partially made of a transparent material.

BACKGROUND

A depth map is an image that includes information about distances from a viewpoint to surfaces of objects (e.g., buildings and other structures). The depth map (e.g., a three-dimensional (3D) point cloud) may be acquired using a 3D optical distancing system. For example, a light detection and ranging (LIDAR) system may use one or more lasers or cameras to collect data points representing distances to different points on an area of interest (e.g., an area outside or inside a building) to generate the 3D point cloud.

A two-dimensional (2D) image may be generated by, for example, a camera, from the same viewpoint as the 3D point cloud and may be used to colorize the 3D point cloud. The generated 2D image and the 3D point cloud may be overlaid and processed to form a colorized 3D point cloud having color pixels attributed to the x, y, and z coordinates for the 3D point cloud.

Depth readings for surfaces of objects or structures including a transparent material such as, for example, glass may be at least partly inaccurate when a LIDAR system is used to generate the 3D point cloud. The light emitted by the LIDAR system is transmitted through the transparent material, and the depth reading corresponds to an object behind the transparent material, or no depth reading is received at all. Accordingly, the LIDAR system inaccurately determines distances from the viewpoint to transparent surfaces such as, for example, windows on a building.

SUMMARY

Systems, apparatuses, and methods are provided for accurately range sensing structures at least partially made of a transparent material. In one embodiment, a method includes identifying, by a processor, a first range data set. The first range data set is generated by a first device and includes first range data points. The first range data points represent distance values from the first device to first positions on a surface of interest, respectively. The surface of interest is made of at least a first material and a second material. The processor identifies a second range data set. The second range data set is generated by a second device and includes second range data points. The second range data points represent distance values from the second device to second positions on the surface of interest, respectively. The processor compares the second range data points to the first range data points. The processor identifies a third range data set based on the comparison. The third range data set includes a subset of the second range data points. The processor adjusts distance values for first range data points of the first range data set corresponding to a portion of the surface of interest based on the third range data set.

In another embodiment, a method includes receiving a first range data set from an optical distancing system. The first range data set represents distances from the optical distancing system to points on a surface of interest, respectively. A second range data set is received from an ultrasonic distancing system. The second range data set represents distances from the ultrasonic distancing system to a subset of the points on the surface of interest, respectively. The second range data set is compared, for the subset of the points on the surface of interest, to the first range data set. A first portion of the surface of interest is identified as being made of a transparent material based on the comparison. Distances of the first range data set corresponding to the first portion of the surface of interest are adjusted based on a subset of the distances of the second range data set. The subset of the distances of the second range data set correspond to the first portion of the surface of interest.

In yet another embodiment, an apparatus includes at least one processor and at least one memory including computer program code for one or more programs. The at least one memory and the computer program code are configured to, with the at least one processor, cause the apparatus to receive a first range data set from an optical distancing system. The first range data set represents distances form the optical distancing system to points on a surface of interest, respectively. The at least one memory and the computer program code are configured to cause the apparatus to receive a second range data set from an ultrasonic distancing system. The second range data set represents distances from the ultrasonic distancing system to a subset of the points on the surface of interest, respectively. The at least one memory and the computer program code are configured to cause the apparatus to compare, for the subset of the points on the surface of interest, the second range data set to the first range data set, and identify a first portion of the surface of interest as being made of a transparent material based on the comparison. The at least one memory and the computer program code are further configured to cause the apparatus to adjust distances of the first range data set corresponding to the first portion of the surface of interest based on a subset of the distances of the second range data set. The subset of the distances of the second range data set correspond to the first portion of the surface of interest.

BRIEF DESCRIPTION OF THE DRAWINGS

Exemplary embodiments are described herein with reference to the following drawings.

DETAILED DESCRIPTION

A hybrid sensor including both an optical sensor and an ultrasonic sensor addresses the depth sensing error caused by a glass structure of, for example, a building. For example, an ultrasonic range sensor is combined with a depth camera to detect transparent glass and correct inaccuracies in three-dimensional (3D) distance data (e.g., a depth map) generated with the depth camera.

The ultrasonic range sensor is rigidly attached to the depth camera and calibrated. Therefore, a point measurement by the ultrasonic range sensor may be mapped to an area on the image plane.

In an area where there is both a depth camera range reading and an ultrasonic range sensor reading, glass and non-glass may be differentiated. The ultrasonic range sensor reports the distance to the glass, while the depth camera, which is based on visible light, cannot report the distance to the glass. If the range readings are significantly different from each other (e.g., the difference between the range readings is greater than a predetermined threshold), the area corresponding to the range readings is identified as being made of a transparent material (e.g., glass). The correct reading of depth is from the ultrasonic range sensor. Otherwise, when the difference between the range readings is less than the predetermined threshold, the area corresponding to the range reading is identified as being made of, for example, an opaque material, and the distance value corresponding to the area for the depth map is the average of the depth camera range reading and the ultrasonic range sensor reading.

If a number of ultrasonic range sensors are provided such that the resolution of the ultrasonic range sensors matches the resolution of the image plane, the range readings may be compared for every depth camera range reading. If, however, only a single ultrasonic range sensor is provided, a scanning process is used. A user may sweep the camera with the ultrasonic range sensor attached over the area of interest. Structure-from-motion techniques are used to track the camera trajectory and thus the ultrasonic range sensor trajectory. From the tracking result, the range maps and the ultrasonic readings may be combined into a single coordinate system. The combined data set includes depth readings from the depth camera corresponding to a number of points R on the area of interest, and depth readings from the ultrasonic range sensor corresponding to a subset of the number of points R on the area of interest.

For the subset of points, consistency between the depth readings from the depth camera and the depth readings from the ultrasonic range sensor is checked. Inconsistencies are detected and corrected. For example, for each point of the subset of points, a difference between the depth reading from the depth camera and the depth reading from the ultrasonic range sensor is calculated. The difference is compared to a predetermined difference. When the difference is greater than the predetermined difference, the correct depth is identified as the depth reading from the ultrasonic range sensor. Points where the difference is greater than the predetermined difference are identified as a set of points G. The set of points G represents a set of points, for which the depths are considered as correct.

The correction introduced by G is propagated to all points R, for which range readings are determined using only the camera. The depth readings for glass or other transparent materials are either not available or are incorrect (e.g., from the opaque structure behind the transparent material) for the points R, for which range reading are determined using only the camera. For the propagation of the correction, two assumptions are made: first, glass structures are flat; and second, the boundary of a glass structure, which is opaque, is correctly obtained within the points R, for which range reading are determined using only the camera.

A greedy method is used to update R. For each point in G, two nearest points to G are identified, and a plane is fit to the point and the two nearest points within G. The number of points in R that are within a small distance to the plane is counted (e.g., the number of points that intersect the plane). If the number of points exceeds or matches a predetermined number of points, then the point in G is identified as being part of a glass structure. The projection of the points in R within the small distance on the plane creates a planar patch that may be added to R. For example, the points in R that are within the small distance to the plane and closest to the point in G define a border around the point in G. The planar patch may be defined by the border. All of the depths for the points in R within the defined border may be set to be equal to the distance for the point in G or may be determined based on the distance for the point in G.

Points within G that are sufficiently close (e.g., within the defined border) to the selected point G may be removed. If the number of points in R that are within the small distance to the plane is less than the predetermined number of points, the selected point G may be marked as visited. This process may be repeated until no more points in G may be visited.

The combined data generated using the depth camera and the ultrasonic range sensor is three-dimensional (3D) data that may be combined with two-dimensional images to colorize the 3D data. In certain embodiments, the 3D data are "depth maps" or "point cloud" data at least partially acquired using 3D optical distancing systems or intensity-based scanning techniques, such as those described in U.S. Pat. No. 8,553,942, which is hereby incorporated by reference in its entirety. In certain embodiments, depth maps or point cloud data are collected using a Light Detection and Ranging (LIDAR) system. LIDAR, also known as LiDAR, Lidar, or other similar representations, may also be referred to as three-dimensional laser scanning or an optical distancing system, which employs one or more lasers or "cameras" to collect data points representing an area, such as an area about a road or walkway. Software generates the depth map or point cloud based on the measured distance, the locations of the optical distancing system, which may be on a moving platform such as a car or a robot for use inside a building, and the angle of the laser. Other optical distancing systems include a stereoscopic camera, a time of flight infrared camera, and a structured light device. A LIDAR device collects and gathers data points in a point cloud in which each data point corresponds to a local coordinate, such as (x, y, z), and is either on or off. Alternatively, the LIDAR data may be a grayscale point cloud including an intensity (indicating reflectivity) for each data point, in a predetermined range of values (e.g., 0 to 255, 0 to 65536) with black at one end of the range and white at the other. The point cloud may be stored in ASCII or LIDAR exchange format (e.g., the American Society for Photogrammetry and Remote Sensing (ASPRS) .LAS file format). The one or more lasers may be in a near infrared spectrum (such as about 700 nm to about 5000 nm or about 800 nm to about 2500 nm) or other light spectrum.

In one embodiment, a LIDAR data acquisition system may be attached or otherwise integrated with a vehicle. There may also be a positioning system (e.g., a GPS) integrated with the LIDAR vehicular system to provide a base reference for the data acquired by the LIDAR system. The mobility of a vehicular system may facilitate acquiring data across a large geographic area using established positions for reference and integration of the acquired data into a point cloud representing the geographic area.

In certain embodiments, the depth maps or point cloud data are at least partially acquired using a 3D ultrasonic distancing system. The 3D ultrasonic distancing system includes one or more ultrasonic range sensors. The one or more ultrasonic range sensors emit a sound wave and determine a time for a reflected sound wave to return to the one or more sensors. The one or more ultrasonic range sensors may be transducers in that the ultrasonic range sensors both emit and receive sound waves. To increase resolution of the 3D ultrasonic distancing system, more than one ultrasonic range sensor may be used. Using a single ultrasonic range sensor, however, reduces computation time.

Figure 1:
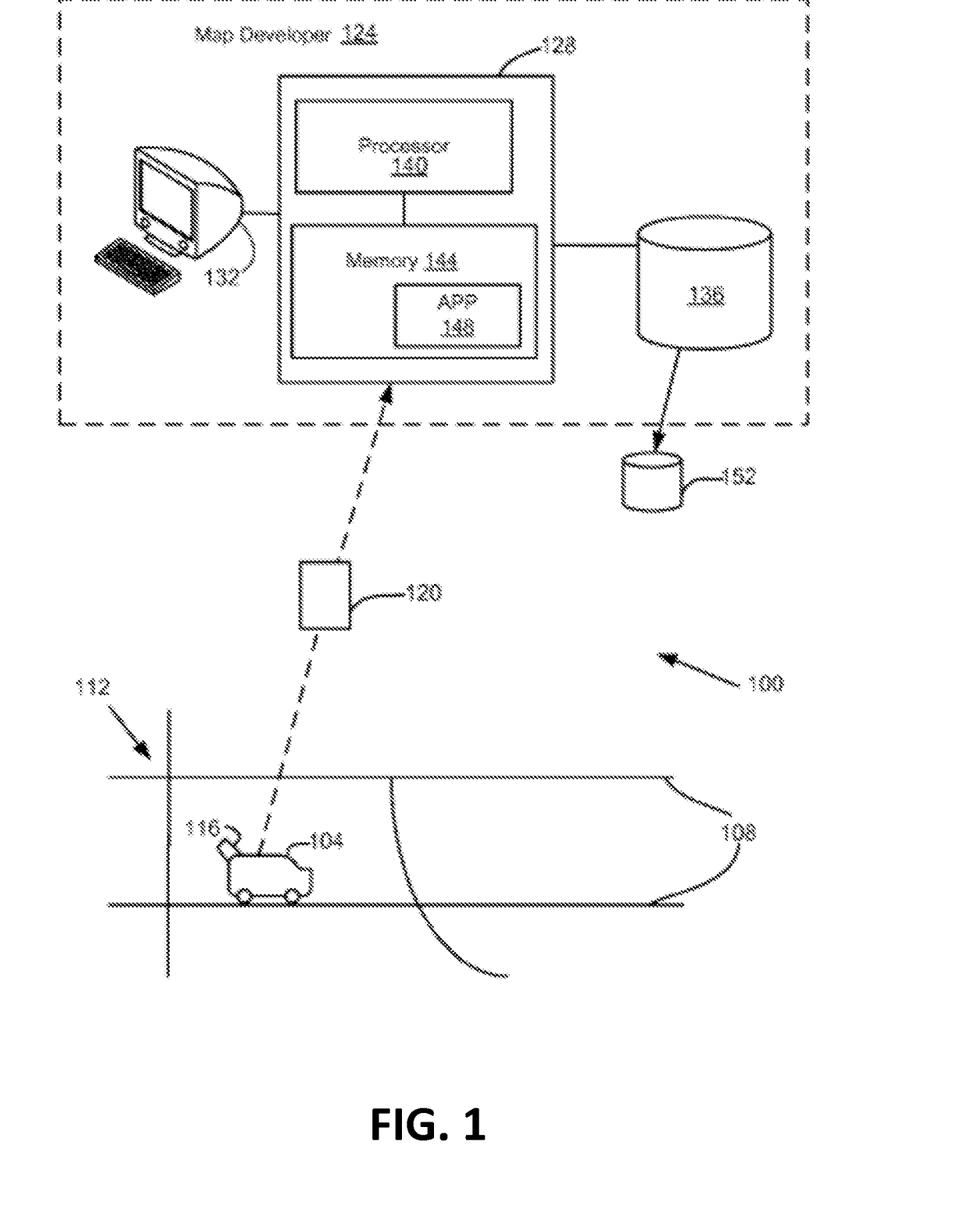
FIG. 1 is a diagram of an exemplary geographic and/or navigation data system.

FIG. 1 shows one embodiment of a geographic and/or navigation data system 100 useful for collecting the 3D data points. The geographic data or navigation system 100 includes, but is not limited to, an object 104 travelling on a path network 108 in a geographic region 112, a device 116, a processing device 128, a workstation or computer 132, and/or a database 136. Additional, fewer, or different components may be provided. For example, a proxy server, a name server, a map server, a cache server or cache network, a router, a switch or intelligent switch, additional computers or workstations, a user interface, administrative components, such as an administrative workstation, a gateway device, a backbone, ports, network connections, and/or network interfaces may be provided. While the components in FIG. 1 are shown as separate from one another, one or more of these components may be combined.

The object 104 is a vehicle, such as a car, truck, motorcycle, bicycle, Segway, or other transportation device or mechanical device used to move on the path network 108. In one embodiment, the object 104 is a robot that is controlled by a user or moves without user interaction. Alternatively, the object 104 may represent a pedestrian, such as a human being or animal that walks or moves along the path network 108. The path network 108 is a road network and/or a collection of other pathways. For example, the path network 108 is a road network made up of various roads. The roads may be used to drive vehicles on, such as local and neighborhood streets as well as highways. Also, instead of or in addition to traditional streets, the path network 108 may include bicycle roads or paths, walking paths, or other travel paths. Alternatively, the path network 108 may be an open area space with no specific paths or travel constraints. The path network 108 is in the geographic region 112, such as a city, a suburb, a state, a country, and/or other geographic region. In one embodiment, the path network 108 is a collection of pathways within a building. The pathways within the building may, for example, be hallways, rooms, lobbies, or any other pathway within a building.

The object 104 travels along or moves about the path network 108 to collect data. A supporting device or housing 116 is attached or connected with or carried by the object 104. The supporting device 116 may be or may include equipment to collect data representing an area about or around a road or path or other area. For example, the collected data may be laser, LIDAR, imagery, ultrasonic and/or video/camera data (such as in the visible spectrum or other spectrum). Other data such as location data, GPS data, and/or other geographic data may be collected.

In one embodiment, the supporting device 116 is a housing or container that is attached to or carried by a pedestrian (the object 104), and as the pedestrian is on and/or moving on a path, sidewalk, or other area, equipment, such as a LIDAR device, an ultrasonic device, and/or a camera, in the supporting device 116 collects data. In another embodiment, the supporting device 116 is a housing or container that is attached to a vehicle and, as the vehicle is on and/or moving on a road or path, equipment, such as the LIDAR device, the ultrasound device, and/or the camera, in the supporting device 116 collects or gathers data corresponding to the surrounding area. Alternatively, the supporting device 116 may be the LIDAR device, the ultrasound device, and/or the camera or parts thereof. In one embodiment, the ultrasound device is rigidly attached to the LIDAR device and calibrated (e.g., relative to the LIDAR device). The supporting device 116 may be positioned at a backend of a vehicle or object and may be angled to enhance collection. In other embodiments, the supporting device 116 may be positioned any place on a vehicle, pedestrian, or object and in any direction.

The collected data is stored on one or more non-transitory computer-readable media 120, such as a CD-ROM, DVD, flash drive, hard drive, or other tangible media suitable to store data. Different types of data may be stored on the same medium 120. Alternatively, separate non-transitory media 120 may be used to store separate or different types of data. In one embodiment, LIDAR or laser data, ultrasonic data, photographs (such as digital or electronic photographs), video images, and/or other image data collected by the object 104 and/or the device 116 are stored in one or more non-transitory media 120. Alternatively, the non-transitory media 120 may be signals carrying or having data. The collected LIDAR data, ultrasonic data, and/or image data may represent areas or regions about or around a path, road, lobby or hallway, or other area. The collected laser or LIDAR data, ultrasonic data and/or images may include geographic features, such as sky features, terrain or surrounding features, roads or paths (such as sidewalks, hallways, or staircases), road or path markings (such as crosswalks or lane markings), road or path signs, points-of-interest (POIs) such as buildings, parks, museums, etc., and/or other features or objects.

The collected image data, via one or more non-transitory media 120, is sent to a map, geographic, and/or navigation data developer 124, such as HERE or Nokia Corporation. For example, a non-transitory medium 120 may be mailed to or brought to the map developer 124. Alternatively, some or all of the collected data may be transmitted to the map developer 124 via a wireless and/or wired network. For example, the network may include the Internet, an intranet, a local area network (LAN), a wide area network (WAN), a virtual private network (VPN), a server network, a cellular network, a satellite network, a broadcasting network, a wireless or wired connection, and/or any known or future network or connection. The term "map developer" may also include third-party contractors.

The processing device 128 maintained by the map developer 124 receives the collected data. The processing device 128 is one or more servers, computers (e.g., a desktop tower or a laptop processing unit), processors, and/or other electronic processing systems or devices. The processing device 128 includes, but is not limited to, a processor 140, a memory 144, and an image software application 148. Additional, fewer, or different components may be provided.

The processing device 128 may include or be in communication with the workstation or computer 132. For example, the workstation 132 is a user interface, electronic console, and/or computer with one or more input devices that may be used to access, control, and/or communicate with the processing device 128 or components thereof.

The processor 140 is a general processor, application-specific integrated circuit (ASIC), digital signal processor, field programmable gate array (FPGA), digital circuit, analog circuit, or combination thereof. In one embodiment, the processor 140 is one or more processors operable to control and/or communicate with the various electronics and logic of the processing device 128. The memory 144 is any known or future storage device. The memory 144 is a non-volatile and/or volatile memory, such as a Random Access Memory (RAM) (electronic), a Read-Only Memory (ROM) (electronic), or an Erasable Programmable Read-Only Memory (EPROM or Flash memory). A memory network may be provided. The memory 144 may be part of the processor 140. The memory 144 is operable or configured to store laser, LIDAR, ultrasonic, and/or image data or other data.

The processor 140 or other processor is configured or adapted to execute the image software application 148, which may be stored in the memory 144 or other memory. For example, the image software application 148 generates a multi-layered image (such as a two-dimensional scalable vector graphics (SVG) multi-layered image) based on model data, such as three-dimensional model data corresponding to a geographic area. In one embodiment, the software application 148 identifies and/or receives three-dimensional model data, such as collected three-dimensional LIDAR point cloud data and three-dimensional ultrasonic point cloud data, and performs processes or rendering sequences to generate a multi-layered graphics image of a geographic area. The generated multi-layered graphics image may be used in navigation or geographic systems as well as in a variety of user interfaces, devices, or systems. Also, the generated multi-layered graphics image may be provided to developers of such systems and/or devices for configuration purposes.

In one embodiment, one or more generated multi-layered graphics images are stored, linked, indexed, and/or associated with or in the database 136, which is in communication with the processing device 128. Alternatively, one or more generated multi-layered graphics images are stored in one or more separate or different databases that may or may not be associated with the database 136 or data thereof. In one embodiment, the geographic database 136 includes data used for navigation-related and/or geographic-related services. For example, the geographic database 136 contains road segment/link and node data records that represent a road network, such as the path network 108. A node represents an end point of a road segment and/or intersection points. The road segments and nodes may be associated with attributes, such as geographic coordinates, street names, address ranges, speed limits, turn restrictions at intersections, and other vehicle navigation attributes, as well as POIs, such as gasoline stations, hotels, restaurants, museums, stadiums, offices, automobile dealerships, auto repair shops, buildings, stores, etc. Alternatively, the geographic database 136 contains path segment/link and node data records or other data that represent pedestrian paths and/or building hallways and rooms in addition to or instead of the vehicle road record data.

The geographic database 136 may be a master geographic database that is stored in a format that facilitates updating, maintenance, and development. For example, the master geographic database 136 or data in the master geographic database 136 is in an Oracle spatial format, such as for development or production purposes. The Oracle spatial format or development/production database may be compiled into a delivery format, such as a GDF format.

The data in the production and/or delivery formats may be compiled or further compiled to form geographic database products or databases 152, which may be used in end user navigation devices or systems or other systems or devices. For example, a customer of the map developer 124 (such as a developer of navigation devices or systems) may receive generated multi-layered graphics images as well as other geographic data in a delivery format and then compile and/or configure such data for end user devices. In one embodiment, geographic data is compiled (such as into a PSF format) to organize and/or configure the data (e.g., segment/link, node, multi-layered graphics image, and/or other data or attributes) for performing navigation-related functions and/or services such as route calculation, route guidance, map display, speed calculation, distance and travel time functions, and other functions, by a navigation device. The navigation-related functions may correspond to vehicle navigation, pedestrian navigation, or other types of navigation.

Figure 2:
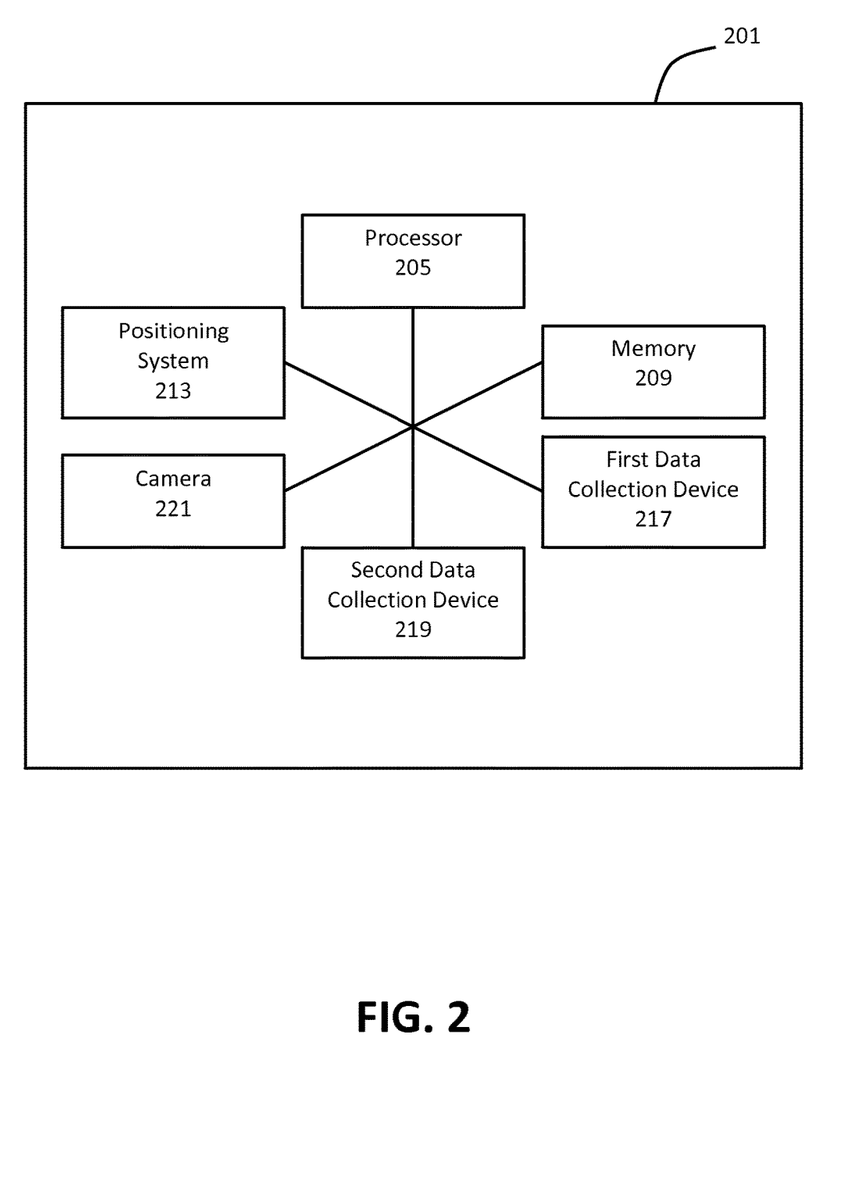
FIG. 2 illustrates an embodiment of components of a device used in the exemplary system of FIG. 1.

FIG. 2 illustrates an embodiment of components of a device 201. For example, the device 201 may be an embodiment of the object 104, such as a vehicle, or may be similar to the supporting device 116. In one embodiment, the device 201 is a support or housing that includes equipment to collect data. For example, the device 201 is removably or integrally attached or connected with a vehicle. The device 201 is positioned at a top backend of the vehicle. Alternatively, the device 201 may be positioned on or in any part of the vehicle at any angle. In another embodiment, the device 201 is attached to or carried by a pedestrian. For example, the device 201 may be a LIDAR and ultrasound device or other device for collecting three-dimensional data.

The device 201 includes, but is not limited to, a processor 205, a memory 209, a positioning system 213, a first data collection device 217, a second data collection device 219, and a camera or camera device 221. Additional, fewer, or different components may be provided. For example, an input device may be provided. The input device may be one or more buttons, a keypad, a keyboard, a mouse, a stylist pen, a trackball, a rocker switch, a touch pad, a voice recognition circuit, another device or component for controlling or inputting data in one or more of the components of the device 201, or any combination thereof. While the components in FIG. 2 are shown as separate from one another, one or more of these components may be combined. Also, some of the components may be provided outside of the device 201. For example, if the device 201 is a housing attached to a vehicle, the positioning system 213, the processor 205, the memory 209, an input device, and/or other components may be in the vehicle or on another part of the vehicle, while the first data collection device 217, the second data collection device 219, and the camera 221 are in the device 201. The first data collection device 217, the second data collection device 219 and the camera 221 may also be separated into different enclosures or supports.

The processor 205 is similar to or different than the processor 140. The processor 205 is configured to operate the collection equipment, such as the positioning system 213, the first data collection device 217, the second data collection device 219, and the camera system 221. For example, the processor 205 sends commands to the various collection devices to collect data and synchronizes or manages the different components. Also, the processor 205 is configured to store data from the collection devices into the memory 209. The memory 209 is similar to or different than the memory 144. The memory 209 is operable or configured to store collected light, laser, LIDAR, ultrasonic, image, and/or position data or other data. The memory 209 may be part of the non-transitory computer-readable medium 120 or may be a separate memory.

The positioning system 213 is a GPS system, one or more mechanical and/or electrical sensors, one or more gyroscopes, a local positioning system, one or more direction sensors, or another system or device for providing position data, such as location data (e.g., longitude, latitude, and/or altitude) and/or direction data, of the device 201, components thereof, or an attached object, such as a vehicle.

The camera 221 is one or more cameras used for taking pictures or videos of a surrounding area. For example, the camera system 221 includes a video camera that records video data (such as in the visible light spectrum) representing geographic features of and about a road or path as a vehicle drives or a robot moves along the road or path. The camera 221 may also capture still photographs separate from the video data. The camera 221 is able to capture different colors and associated text of geographic features.

The first data collection device 217 may be a light data collection device. For example, the first data collection device 217 may include a light source and a light receiver. In one embodiment, the first data collection device 217 is a LIDAR device or sensor, a laser device, and/or other device that collects data points, such as three-dimensional data, by transmitting and receiving light. In one embodiment, the LIDAR device is a sixty-four element LIDAR sensor. For example, one sensor that rotates at about 180° and may provide fewer data points but with lower noise, and one sixty-four element LIDAR sensor that rotates at about 360° and may provide more dense data points but with noisier data may be used.

The second data collection device 219 may be an ultrasonic data collection device. For example, the second data collection device 219 may include one or more ultrasonic sensors. The one or more ultrasonic sensors may be transceivers that both send and receive sound waves. The one or more ultrasonic sensors may be active ultrasonic sensors in that the one or more ultrasonic sensors generate high frequency sound waves and detect echoes received by the one or more ultrasonic sensors. The one or more ultrasonic sensors may determine a distance to an object by measuring a time between sending the high frequency sound waves and receiving the echoes. In one embodiment, the one or more ultrasonic sensors may have a narrow field of view (FOV) (e.g., return a single point measurement). The one or more ultrasonic sensors are rigidly attached to the LIDAR sensor, for example, and calibrated. Other configurations may be provided.

In addition to the collection of 3D point cloud data, 2D images may also be captured using a data collection system, such as, but not limited to, the geographic or navigation data system depicted in FIGS. 1 and 2, and described above. In certain embodiments, the captured 2D images are color images.

Similar to the 3D data point collection, the 2D images may be collected using the object 104 (e.g., vehicle or pedestrian) having the supporting device 116 including, for example, the camera. In certain embodiments, the 2D image data and the 3D image data are collected using the same object 104 and/or supporting device 116 at a similar time, or approximately the same time. In certain embodiments, the 2D and 3D image data are collected using the same object 104 and/or supporting device 116 from a similar vantage point (e.g., capturing the image data from a similar geographic location using the object/supporting device positioned in the same direction). In other embodiments, the 2D image data and the 3D image data are collected using a different object and/or supporting device, and the 2D image data and the 3D image data may be collected at different times and registered.

In certain embodiments, one or more individual 2D images are captured from different angles or perspectives. In one embodiment, at least four individual 2D images are captured from different angles or perspectives. In another embodiment, at least six individual 2D images are captured from different angles or perspectives. For example, the 2D images may be captured from a spherical vision camera device.

The collected 2D image data may be stored on one or more non-transitory computer-readable media 120, such as a CD-ROM, DVD, flash drive, hard drive, or other tangible media suitable to store data. In certain embodiments, the 2D and 3D data are stored on the same computer-readable media. In other embodiments, the 2D and 3D data are stored on separate media.

Like the 3D image data, the collected 2D image data may be sent to a map, geographic, and/or navigation data developer 124, such as HERE or Nokia Corporation, for further processing.

In certain embodiments, the collected 3D point cloud data is further processed with the collected 2D image data. In certain embodiments, the 2D color images are used to colorize the 3D point cloud. The colorization process may involve overlaying a 3D point cloud with a 2D image of the same scene. For example, 3D LIDAR point clouds are overlaid with 2D color images from the same perspectives. Based on this matching of 2D and 3D data, the 3D point cloud data may be colorized to form a 3D colored point cloud.

In other embodiments, if the 3D point cloud and the 2D color images are collected from different angles and/or positions, additional geometric calculations are necessary to properly align the point cloud and the 2D color image.

The associations between the pixels of the 2D color image and the point cloud depth values may be stored in a database. In other words, the 3D point cloud and the 2D color images may be pre-aligned, and the overlaid or combined data is stored in the database.

In addition to the colorization process, the 3D data may also be processed prior to or after the colorization process. For example, 3D data points may be acquired in multiple sets through several LIDAR data acquisition sessions and/or several ultrasonic data acquisition sessions, and may need to be assembled into a unified point cloud on a common coordinate system for further processing. In one embodiment, the LIDAR data acquisition sessions and the ultrasonic data acquisition sessions are at the same time, respectively. Multiple sets of 3D data points may be assembled into a unified point cloud using any registration technique. In an embodiment, a local registration technique is used between two sets of 3D data points. For example, Iterative Closest Point (ICP) techniques may be used to align the rotation and translation differences in the 3D data point sets. ICP techniques may iteratively revise alignments or transformations to the 3D data point sets such that the distance, or measured difference, between the 3D data point sets is minimized.

LIDAR point clouds may also undergo point cloud smoothing during processing to minimize or remove 3D data points that do not accurately represent a geographic area, or structures in a geographic area. Any point cloud smoothing technique may be used. In an embodiment, a moving least squares technique is used to minimize a weighted least square error for each 3D data point of the point cloud.

Optical range systems including, for example, a LIDAR device provide inaccurate depth readings for structures including transparent materials. For example, when a depth map is to be provided for a pathway including structures having windows or the inside of a building including windows, the LIDAR device returns an incorrect depth or distance or does not return anything at all for transparent structures. Using, an ultrasonic range system together with the optical range system, the inaccurate depth readings provided by the optical range system are corrected based on data generated by the ultrasonic range system.

Figure 3:
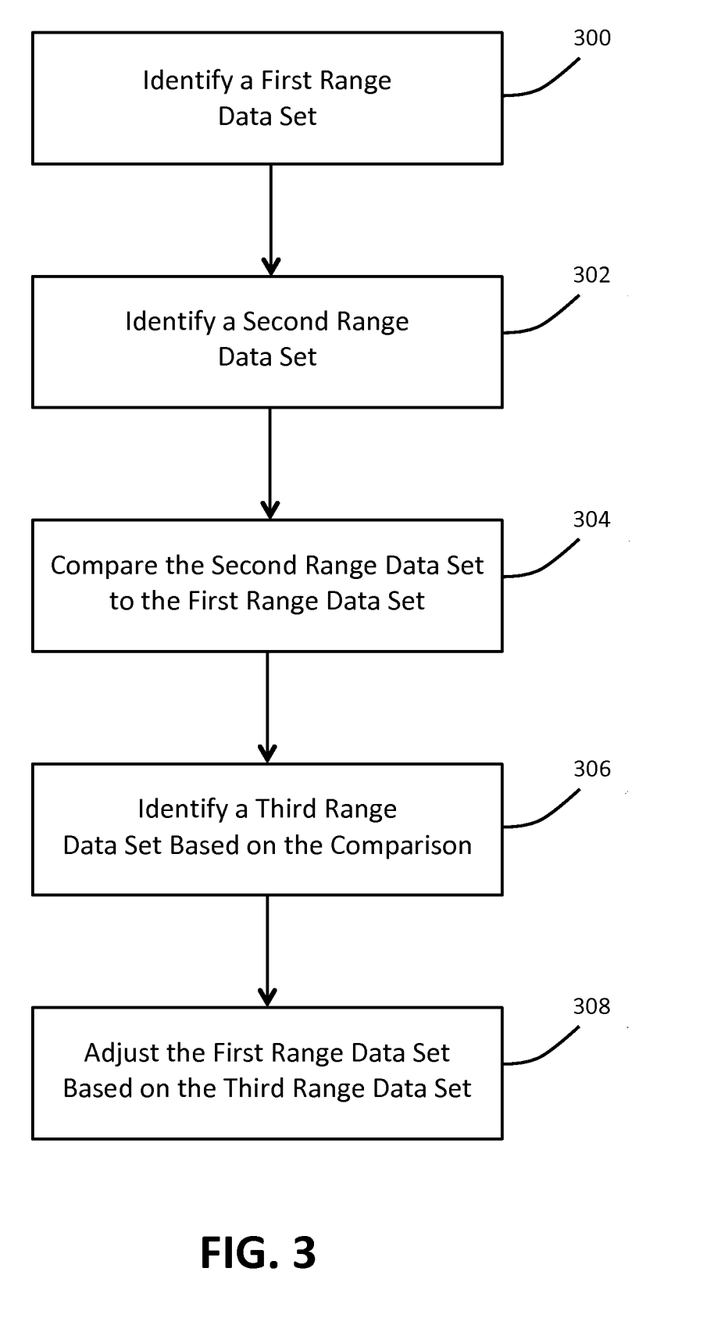
FIG. 3 illustrates an example flowchart for range sensing.

FIG. 3 shows a flowchart of one embodiment of a method for generating and/or correcting a depth map. The method may be performed using the systems shown in FIGS. 1 and 2. The method is implemented in the order shown, but other orders may be used. Additional, different, or fewer acts may be provided. Similar methods may be used for generating and/or correcting a depth map.

In act 300, a processor identifies a first range data set representing a surface of interest or an area of interest. The first range data set is generated by a first device and includes first range data points. The first device may be any number of range sensing devices. For example, the first device may be an optical range sensing device (e.g., visible light-based) such as a depth camera or a LIDAR device.

The processor may receive the first range data set from the first device. In another embodiment, the first device may save the first range data set to a memory in communication with the processor, and the processor may identify the first range data set stored in the memory.

The first device may be attached to a movable vehicle such as, for example, a car or a robot. Alternatively, the first device may be held by a user. The first device may be swept over the surface of interest automatically by the attachment to the movable vehicle. Alternatively, the user may sweep the first device over the surface of interest.

The first range data points represent distance values from the first device to first positions on the surface of interest, respectively. In another embodiment, the first range data points represent distance values from the first device to first positions on the area of interest. A surface of interest may be three-dimensional, while an area of interest may be two-dimensional. For example, a surface of interest may include recesses, while an area of interest may be a flat wall. The surface of interest is made of at least a first material and a second material. The first material may be any number of transparent materials including, for example, glass or plastic. The second material may be any number of opaque or semi-transparent building materials (e.g., for which accurate depth readings are provided by the first device) including, for example, any number of metals, brick, clay, stone, wood, or another opaque or semi-transparent material. The surface of interest may be a wall of a building or structure made at least partially of the first material and the second material. For example, the surface of interest may be a wall of a building that is made of stone and includes a recessed window made of glass.

Figure 4:
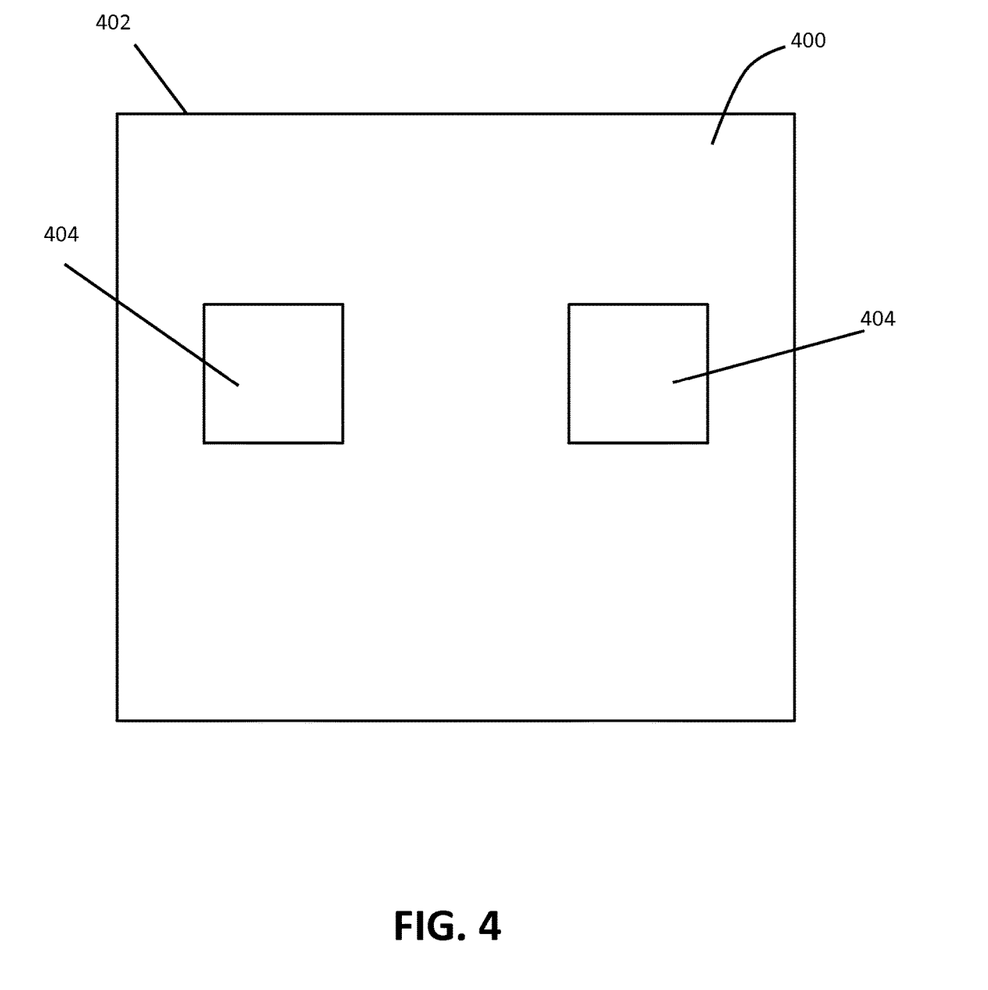
FIG. 4 shows an exemplary surface of interest.

FIG. 4 shows an exemplary surface of interest 400. The surface of interest 400 in the example of FIG. 4 is at least partially defined by an external wall 402 of a building and two windows 404. The external wall 402 is, for example, made of the second material, while the two windows 404 are made of the first material. The surface of interest may be any number of dimensions, may be made of more or fewer materials, and/or may include more or fewer windows.

In act 302, the processor identifies a second range data set representing the surface of interest. The second range data set is generated by a second device and includes second range data points. The second device may be any number of range sensing devices. For example, the second device may be an ultrasonic range sensing device including, for example, one or more ultrasonic sensors. The one or more ultrasonic sensors may be transducers in that the one or more ultrasonic sensors send and receive sound waves. The one or more ultrasonic sensors determine distances to points on the surface of interest, respectively, by emitting sound waves and determining times between emission of the sound waves and receipt of sound waves echoes.

The processor may receive the second range data set from the second device. In another embodiment, the second device may save the second range data set to the memory or another memory in communication with the processor, and the processor may identify the second range data set stored in the memory or the other memory.

Figure 5:
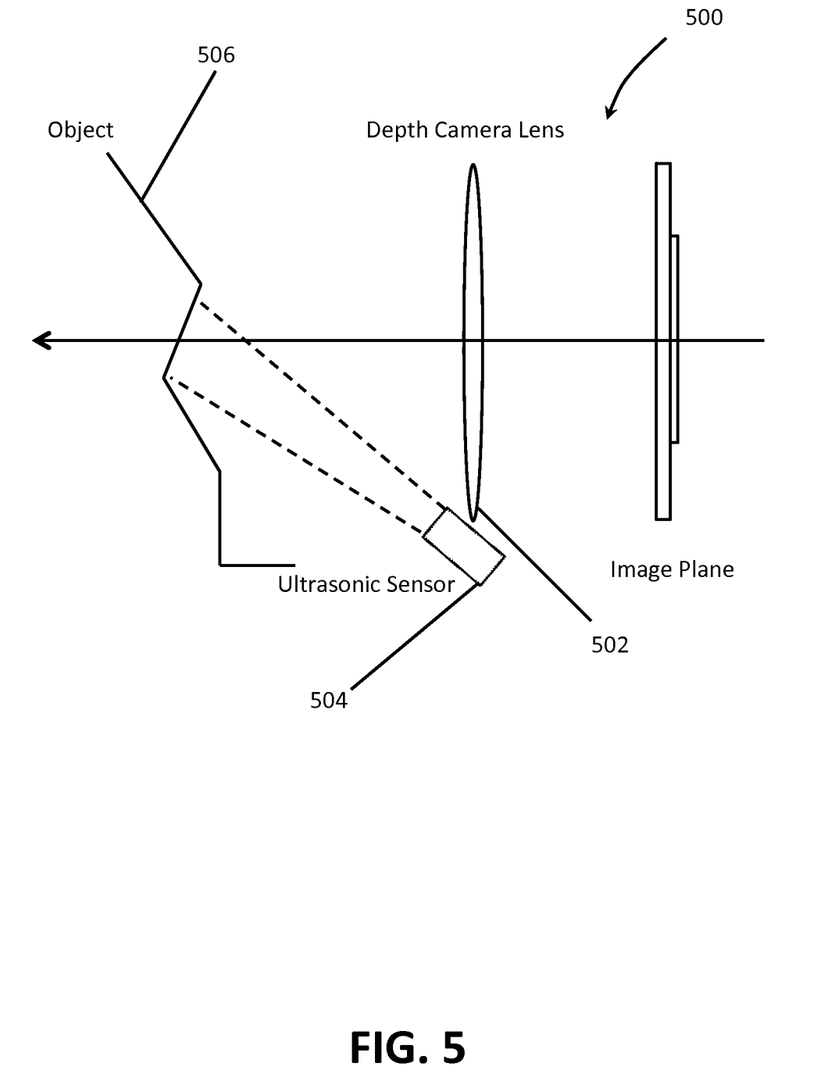
FIG. 5 shows one embodiment of a hybrid range sensing device.

The second device may also be attached to the movable vehicle. Alternatively, the second device may be held by the user along with or separate from the first device. In one embodiment, the second device is rigidly attached to a housing of the first device and calibrated so that data generated by the second device is in the same coordinate system as data generated by the first device. FIG. 5 shows one embodiment of a hybrid range sensing device including a first device 500 (e.g., a depth camera including a lens 502) and a second device 504 (e.g., an ultrasonic device including an ultrasonic sensor). The second device 504 is physically attached to and calibrated with the first device 500. For example, as shown in FIG. 5, the ultrasonic device may be physically attached to the depth camera, in line with the depth camera lens 502. The depth camera 500 and the ultrasonic sensor 504 determine times between emission and receipt of reflection of visible light and sound waves, respectively, by a surface of interest 506 (e.g., an object such as a wall of a building). The second device 504, along with the first device 500, may be swept over the surface of interest automatically by the attachment to the movable vehicle or by the user, for example. Other hybrid range sensing devices may be used.

The second range data points represent distance values from the second device to second positions on the surface of interest, respectively. The second device may generate data with less resolution that the first device. For example, the second device (e.g., the ultrasonic range sensing device) may include a single ultrasonic sensor having a narrow field of view (FOV) essentially returning single point measurements. Due to the lesser resolution of the second device compared to the first device, the second range data set includes fewer range data points than the first range data set. For example, the second range data set may include distance values to a subset of the points or positions on the surface of interest represented by the first range data set.

In act 304, the processor compares range data points of the second range data set to range data points of the first range data set. The processor compares the range data points of the second range data set to a corresponding subset of range data points of the first range data set (e.g., since there are more range data points in the first range data set than in the second range data set). Positions on the surface of interest of the subset of range data points of the first range data set correspond to positions on the surface of interest of the range data points of the second range data set, respectively.

In one embodiment, the comparison includes calculating, for each second range data point, a difference between the second range data point and the first range data point corresponding to the same position on the surface of interest as the second range data point. In one embodiment, the processor may further process the calculated difference by taking the absolute value of the calculated difference.

In one embodiment, the calculated difference is compared to a predetermined value or threshold. The predetermined threshold, for example, may be stored in the memory. The predetermined threshold may represent an allowable inaccuracy for the first device and/or the second device. For example, the predetermined threshold may be 25 mm or 50 mm. Other thresholds may be provided.

In act 306, a third range data set is identified based on the comparison. The third range data set may be identified as the subset of the second range data points for which the calculated difference exceeds the predetermined threshold, for example. In one embodiment, the third range data set is identified as a subset of the second range data points and is not a newly generated data set. In another embodiment, the processor generates the third range data set based on the identified subset of the second range data points and saves the third range data set to the memory.

In act 308, distance values for the first range data points corresponding to a portion of the surface of interest are adjusted based on the third range data set. As an example, for a position on a window 404 of FIG. 4, the second range data is an accurate representation of the distance from the second device (and thus, the first device), to the position on the window 404. The first range data point generated by the first device (e.g., the depth camera), however, is an inaccurate representation of the distance from the first device (and thus, the second device) since light emitted by the depth camera passes through the window and is reflected by an opaque or semi-transparent material behind the window or is not reflected back to the depth camera at all.

A portion of the first range data set may be updated based on the calculated difference. When the calculated difference is greater than the predetermined threshold, the second range data point is identified as being accurate and saved to the first range data set, overwriting the first range data point for the corresponding position on the surface of interest, for example. When the calculated difference is less than the predetermined threshold, the first range data point and the second range data point for the corresponding position on the surface of interest may be averaged and saved to the first range data set, overwriting the first range data point. Alternatively, when the calculated difference is less than the predetermined threshold, the first range data point for the corresponding position on the surface of interest may be identified as accurate and left without changes within the first range data set.

In one embodiment, only a small number of first range data points of the first range data set are adjusted based on the comparison in act 304. This is due to the higher resolution of the first device compared to the second device, for example. As an example, there may be one second range data point for every hundred first range data points. Accordingly, the adjustment or correction applied to the first range data points based on the comparison in act 304 is propagated to at least some other first range data points in the first range data set.

In one embodiment, two assumptions are made for this propagation of the adjustment: the glass (e.g., the window 404) is flat; and a boundary around the glass (e.g., a frame around the window 404), which is opaque, for example, is correctly obtained in the first range data set.

In one embodiment, a greedy method is used to update or adjust the first range data set, but other methods may be used to update the first range data set. A second range data point corresponding to a position on the surface of interest is selected from the third range data set identified in act 306. Two second range data points of the third range data set nearest to the selected second range data point (e.g., with regard to corresponding position on the surface of interest) are identified, and a plane (e.g., a 2D plane in 3D space) is fit to the selected second range data point and the two identified second range data points. Other second range data points may be identified for fitting the plane.

The identified plane is overlapped with the first range data set, and the processor counts the number of first range data points that are within a predetermined distance to the plane. The predetermined distance may be stored in the memory and may, for example, be zero (e.g., the first range data points intersecting with the plane) or may be a small distance to account for the depth from an exterior wall of a building to the exterior surface of a recessed window (e.g., 10 cm).

The counted number of first range data points within the predetermined distance to the plane is compared to a predetermined number of data points. The predetermined number of data points may be stored in the memory, for example. The predetermined number of data points may be any number including, for example, 200, 500, 1000, or 5000. When the counted number of first range data points is greater than (or greater than or equal to) the predetermined number of data points, the situation of light passing through the surface of interest (e.g., the window 404) and reflecting off another surface behind the surface of interest is identified. The corresponding position on the surface of interest is thus identified as being associated with a transparent material (e.g., the window 404).

The first range data points within the predetermined distance to the plane form a border or frame around the second range data point selected from the third range data set. The space within the identified frame or border is identified as being made of the first material (e.g., glass), for example. First range data points on the identified frame or border that are closest to the selected second range data point may define a 2D planar patch in 3D. In one embodiment, distance values for the first range data points within the defined 2D planar patch may be adjusted or corrected based on or to equal the distance value of the selected second range data point. Alternatively, distance values for different portions of the 2D planar patch may be based on range data points of the third range data set corresponding to the different portions of the 2D planar patch. In one embodiment, distance values may calculated for the first range data points within the defined 2D planar patch using interpolation of the distance values for the first range data points defining the identified frame or border.

In one embodiment, the adjustment described above is repeated for each range data point of the third range data set. Once a border around a selected range data point of the third range data set has been defined, all range data points of the third range data set may be identified as visited or may be deleted from the third range data set. Some or all of the acts of the method shown in FIG. 3 may be repeated until there are no more range data points of the third range data set to select.

Using the method shown in FIG. 3, multiple portions of one or more surfaces of interest may be identified as being made of a transparent material such as glass, and a range map generated with a depth camera or LIDAR, for example, may be corrected to account for such transparent materials. More accurate depth maps (e.g., compared to depth maps generated using only a depth camera or LIDAR) may thus be generated. The method also allows low resolution ultrasonic devices to be used, thus decreasing the cost of equipment and computation time.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, and HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A method for accurately range sensing structures at least partially made of a transparent material, the method comprising:
   identifying, by a processor, a first range data set, the first range data set being generated by a first device and comprising first range three-dimensional (3D) data points, the first range 3D data points representing distance values from the first device to first positions on a surface of interest, respectively, the surface of interest being made of at least a first material that is transparent to visible light and a second material that is opaque to visible light;
   identifying, by the processor, a second range data set, the second range data set being generated by a second device and comprising second range 3D data points, the second range 3D data points representing distance values from the second device to second positions on the surface of interest, respectively;
   determining, by the processor, that a portion of the surface of interest comprises the first material by calculating, for each of the second range 3D data points, a difference between the second range 3D data point and the first range 3D data point corresponding to the portion of the surface of interest and comparing the differences to a predetermined threshold;
   identifying, by the processor, a third range data set based on the comparison, the third range data set comprising a subset of the second range 3D data points for which the differences exceed the predetermined threshold, wherein the differences exceed the predetermined threshold when the portion of the surface of interest comprises the first material;
   adjusting, by the processor, distance values for the first range 3D data points of the first range data set corresponding to the portion of the surface of interest comprising the first material by overwriting the distance values for the first range 3D data points of the first range data set with the subset of the second range 3D data points; and
   generating, by the processor, a depth map using the adjusted distance values for the first range 3D data points of the first range data set,
   wherein the adjusting comprises:
      selecting a range 3D data point of the third range data set;
      identifying the first range 3D data points corresponding to positions closest to a first material position corresponding to the range 3D data point of the third range data set; and
      adjusting the distance values for the first range 3D data points corresponding to the portion of the surface of interest based on the identified first range 3D data points,
   wherein identifying the first range data set comprises generating the first range data set using the first device, the first device comprising an optical sensor, and
   wherein identifying the second range data set comprises generating the second range data set using the second device, the second device comprising an ultrasonic sensor.

2. The method of claim 1, wherein the number of first range 3D data points is greater than the number of second range 3D data points, and
   wherein the second positions are the same as a subset of the first positions.

3. The method of claim 1, wherein the adjusting further comprises:
identifying two adjacent range 3D data points of the third range data set, the two adjacent range 3D data points being closest 3D data points of the third range data set to the range 3D data point, with respect to positions on the surface of interest;
fitting a two-dimensional (2D) plane to the range 3D data point of the third range data set and the two adjacent range 3D data points of the third range data set;
determining a number of first range 3D data points of the first range data set within a predetermined distance to the 2D plane; and
identifying the first material position corresponding to the range 3D data point of the third range data set as corresponding to the first material when the determined number of first range 3D data points is greater than a predetermined number.

4. The method of claim 3, wherein adjusting the distance values for the first range 3D data points corresponding to the portion of the surface of interest comprises setting the distance values for the first range 3D data points corresponding to the portion of the surface of interest to equal the distance value for the range 3D data point.

5. The method of claim 3, wherein determining the number of first range 3D data points within the predetermined distance to the 2D plane comprises determining the number of first range 3D data points that intersect the 2D plane.

6. The method of claim 3, wherein the selecting, the identifying of the two adjacent range 3D data points, the fitting, the determining, the identifying of the second position corresponding to the range 3D data point as corresponding to the first material, the identifying of the first range 3D data points corresponding to positions closest to the second position corresponding to the range 3D data point, and the adjusting of the distance values for the first range 3D data points corresponding to the portion of the surface of interest based on the identified first range 3D data points are repeated for at least some range 3D data points of the third range data set.

7. The method of claim 1, wherein the distance values for the first range 3D data points and the distance values for the second range 3D data points corresponding to the portion of the surface of interest are averaged when the differences are less than the predetermined threshold.

8. A method for accurately range sensing structures at least partially made of a transparent material, the method comprising:
receiving a first range data set from a three dimensional (3D) optical distancing system, the first range data set representing distances from the 3D optical distancing system to 3D points on a surface of interest, respectively;
receiving a second range data set from an ultrasonic distancing system, the second range data set representing distances from the ultrasonic distancing system to a subset of the 3D points on the surface of interest, respectively;
comparing, for the subset of the 3D points on the surface of interest, a difference between the second range data set and the first range data set to a predetermined threshold;
identifying a first portion of the surface of interest as being made of a transparent to visible light material based on the comparison exceeding the predetermined threshold;
adjusting distances of the first range data set corresponding to the first portion of the surface of interest based on a subset of the distances of the second range data set by overwriting the distance values of the first range data set with the subset of the second range data set, the subset of the distances of the second range data set corresponding to the first portion of the surface of interest; and
generating a depth map using the adjusted distances of the first range data set corresponding to the first portion of the surface of interest,
wherein the adjusting comprises:
selecting a range data set of a subset of the second range data set for which the comparison exceeds the predetermined threshold;
identifying the first range data set corresponding to positions closest to a first material position corresponding to the range data set; and
adjusting the distances of the first range data set corresponding to the portion of the surface of interest based on the identified first range data set.

9. The method of claim 8, wherein the subset of the second range data set comprises distances for 3D points on the surface of interest.

10. The method of claim 9, wherein identifying the first portion of the surface of interest as being made of the transparent to visible light material comprises:
selecting a 3D point on the surface of interest represented by a distance of the subset of the second range data set;
identifying two adjacent 3D points on the surface of interest represented by distances of the subset of the second range data set, respectively, the two adjacent 3D points being 3D points on the surface of interest nearest to the 3D point;
fitting a two-dimensional (2D) plane to the 3D point on the surface of interest and the two identified adjacent 3D points on the surface of interest;
determining a number of 3D points on the surface of interest represented by distances of the first range data set within a predetermined distance to the 2D plane;
identifying the 3D point on the surface of interest as corresponding to the transparent material when the determined number of 3D points on the surface of interest represented by the first range data set within the predetermined distance is greater than or equal to a predetermined number; and
defining a border around the 3D point on the surface of interest, the defining of the border comprising identifying 3D points on the surface of interest represented by the first range data set closest to the 3D point on the surface of interest,
wherein the first portion of the surface of interest is within the defined border around the 3D point.

11. The method of claim 8, further comprising identifying a second portion of the surface of interest as being made of an opaque to visible light material based on the comparison.

12. An apparatus for accurately range sensing structures at least partially made of a transparent material, the apparatus comprising:
at last one processor; and
at least one memory including computer program code for one or more programs, the at least one memory and the computer program code configured to, with the at least one processor, cause the apparatus to at least perform:
receive a first range data set from a three dimensional (3D) optical distancing system, the first range data set representing distances from the optical distancing system to 3D points on a surface of interest, respectively;
receive a second range data set from an ultrasonic distancing system, the second range data set representing distances from the ultrasonic distancing system to a subset of the 3D points on the surface of interest, respectively;
compare, for the subset of the 3D points on the surface of interest, a difference between the second range data set and the first range data set to a predetermined threshold;
identify a first portion of the surface of interest as being made of a transparent to visible light material based on the comparison exceeding the predetermined threshold;
adjust distances of the first range data set corresponding to the first portion of the surface of interest based on a subset of the distances of the second range data set by overwriting the distance values of the first range data set with the subset of the second range data set, the subset of the distances of the second range data set corresponding to the first portion of the surface of interest; and
generate a depth map using the adjusted distances of the first range data set corresponding to the first portion of the surface of interest,
wherein the adjusting comprises:
select a range data set of a subset of the second range data set for which the comparison exceeds the predetermined threshold;
identify the first range data set corresponding to positions closest to a first material position corresponding to the range data set; and
adjust the distances of the first range data set corresponding to the portion of the surface of interest based on the identified first range data set.

13. The apparatus of claim 12, wherein the surface of interest is a surface of a wall of a building including a window.

14. The apparatus of claim 12, wherein the subset of the second range data set comprises distances for 3D points on the surface of interest.

15. The apparatus of claim 12, wherein the subset of the distances of the second range data set is a first subset of distances,
wherein the at least one memory and the computer program code are configured to cause the apparatus to further perform:
identify a second portion of the surface of interest as being made of an opaque to visible light material based on the comparison; and
adjust at least some distances of the first range data set corresponding to the second portion of the surface of interest based on a second subset of the distances of the second range data set, the second subset of the distances of the second range data set corresponding to the second portion of the surface of interest,
wherein the adjustment of the at least some distances of the first range data set corresponding to the second portion of the surface of interest comprises an average, for each 3D point of the second portion of the surface of interest corresponding to the second range data set, of the distance of the first range data set and the distance of the second range data set corresponding to the 3D point on the second portion of the surface of interest.

* * * * *